United States Patent

Novak et al.

[11] Patent Number: 5,809,522
[45] Date of Patent: Sep. 15, 1998

[54] MICROPROCESSOR SYSTEM WITH PROCESS IDENTIFICATION TAG ENTRIES TO REDUCE CACHE FLUSHING AFTER A CONTEXT SWITCH

[75] Inventors: Steve Novak, San Jose; Hong-Yi Chen, Fremont, both of Calif.

[73] Assignee: Advanced Micro Devices, Inc., Sunnyvale, Calif.

[21] Appl. No.: 573,622

[22] Filed: Dec. 18, 1995

[51] Int. Cl.$^6$ .............................. G06F 12/00; G06F 13/00
[52] U.S. Cl. ...................... 711/118; 711/128; 711/135; 711/209; 395/569; 395/678
[58] Field of Search ................... 395/455, 462, 395/471, 677, 678, 445, 412, 415, 416, 417, 569; 711/128, 118, 135, 144, 202, 205, 206, 207, 209

[56] References Cited

U.S. PATENT DOCUMENTS

| 4,525,778 | 6/1985 | Cane | 711/207 |
|---|---|---|---|
| 4,928,225 | 5/1990 | McCarthy et al. | 711/145 |
| 5,287,508 | 2/1994 | Hejna, Jr. et al. | 395/677 |
| 5,319,760 | 6/1994 | Mason et al. | 711/208 |
| 5,428,757 | 6/1995 | Sutton | 395/677 |
| 5,564,052 | 10/1996 | Nguyen et al. | 711/207 |
| 5,627,987 | 5/1997 | Nozue et al. | 711/200 |

FOREIGN PATENT DOCUMENTS

| 0442474 | 8/1991 | European Pat. Off. . |
|---|---|---|
| 4-205636 | 7/1992 | Japan . |

Primary Examiner—Glenn Gossage
Attorney, Agent, or Firm—H. Donald Nelson

[57] ABSTRACT

An x86 microprocessor system with a process identification system which stores a number assigned to each process run by the microprocessor system and associates this number with instructions, data, and information fetched and stored in a cache or translation lookaside buffer (TLB) during the execution of the process. Upon a process or context switch, the instructions, data, and information are not automatically flushed from the cache and TLB. The instructions, data, and information are replaced only when instructions, data, and information for a new process require the same cache memory locations or the same TLB memory location. The cache and TLB may include a valid bit block and a tag block that includes memory locations for storing the pertinent process identification number for each entry. The cache, which may be a set associative cache, and TLB include logic for comparing a process identification number stored in a process identification register with the process identification number stored in the tag block.

7 Claims, 6 Drawing Sheets

MICROPROCESSOR SYSTEM WITH PROCESS IDENTIFICATION TAG ENTRIES TO REDUCE CACHE FLUSHING AFTER A CONTEXT SWITCH

BACKGROUND OF THE INVENTION

1. Field of the Invention

This invention relates generally to x86 microprocessor systems, and, more particularly to x86 microprocessor systems having a cache and a translation lookaside buffer.

2. Discussion of the Related Art

A cache memory is a small, fast memory which is designed to contain the most frequently accessed words from a larger, slower memory. The concept of a memory hierarchy with a cache as part of the hierarchy has been associated with the computer art from the earliest discussions of computer design. The idea of a memory hierarchy, with memory speed and memory size being the tradeoff, was discussed in John von Neumann's report on the design of the EDVAC (Electronic Discrete Variable Automatic Computer), a report written in the mid-1940s. The necessity for a cache with faster memory became more apparent because of the competition for the communication channel, which has become known as the "von Neumann bottleneck." This bottleneck and the inherent slowness of large memory components such as disk or tape drives became even more critical in the early 1960s when CPU (central processing unit) speeds could exceed core memory speeds by a factor of 10. As can be appreciated, this factor has become even more critical as CPU speeds have increased by orders of magnitude since the 1960s.

When the International Business Machines ("IBM") Corporation (Armonk, N.Y.) personal computer ("PC") was introduced, it was based on the Intel Corporation (Santa Clara, Calif.) (hereinafter "Intel") 8088 microprocessor running at 4.77 MegaHertz. The 8088 takes four ticks of its 4.77 MegaHertz PCLK (Processor clock) to run a 0-wait-state bus cycle, so a 0-wait-state bus cycle takes 838 nanoseconds (4×209.5 nanoseconds=838 nanoseconds). At that time, nearly every DRAM (Dynamic Random Access Memory) or ROM (Read Only Memory) available could respond within the 838 nanosecond period of time, so wait states weren't an issue. However, since then processor speeds have increased by orders of magnitude over the increase in speed of available DRAM. In order to take advantage of the faster and more powerful microprocessors, it was necessary to devise methods to overcome the problem of the slow memory. One solution is to use SRAM (Static Random Access Memory) which is capable of providing zero-wait-state performance. However, this solution is not feasible for the following reasons: (1) SRAM is approximately 10 times more expensive that DRAM; (2) SRAM is physically larger than DRAM, thus requiring more space on a chip which is contrary to a major emphasis in new chip design which is to make new chips as small as possible to increase speed and performance; (3) SRAM requires more power than DRAM during normal operation which is contrary to another emphasis in new chip design which is to decrease power consumption, especially in chips that may be used in systems that will be run on battery power such as laptop, notebook, and palmtop systems; and (4) SRAM generates more heat than DRAM which may require a larger fan or other methods of cooling, which in turn requires more power and more space in the system, both of which are contrary to power and space requirements.

An alternate solution chosen by most manufacturers and users that require fast data processing is to use one or more cache memories. Implementation of a cache memory achieves a reasonable system cost and a high percentage of 0-wait-state bus cycles when accessing memory. A system implementing cache memory uses DRAM in main memory and SRAM in a relatively small cache memory. A cache controller attempts to maintain, in cache memory, copies of frequently accessed information read from DRAM in main memory. The cache controller keeps track of which information has been copied into the cache memory. The cache controller, when the microprocessor initiates a memory read bus cycle, determines if a copy of the requested information is in the cache memory. If a copy of the requested information is in the cache memory, it is sent to the microprocessor via the data bus, thus obviating the requirement for accessing the slower DRAM. This is known as a read hit. The access can be completed in 0 wait states because the information is fetched from the fast access SRAM in the cache memory. If the cache controller determines that the information is not in the cache memory, the information must be read from DRAM in the main memory. This is known as a read or cache miss, and because of the necessity to obtain the information from slow DRAM in the main memory, there are wait states until the information is sent to the microprocessor. For each read miss, the overall microprocessor system's performance is degraded because it must wait until the necessary information is fetched, decoded, and made available to the microprocessor for execution. When the information is sent to the microprocessor, the information is also copied into the cache memory by the cache controller and the cache controller updates an internal directory to indicate that the information is in the cache memory.

Cache systems work because most programs that run on microprocessor systems require the same information from consecutive memory locations over and over again within short time periods. This concept is called the locality of reference principle and is comprised of two components: temporal locality and spatial locality. Temporal locality is based on the fact that programs run in loops, which means that the same instructions must be fetched from memory on a frequent and continuing basis. Spatial locality refers to the fact that programs and the data the programs request tend to reside in consecutive or closely contiguous memory locations.

The cache works as follows. Assume that the cache memory is empty, i.e., it contains no copies of information from DRAM memory. The first time a program or process is needed by the microprocessor, the following seven events take place:

1. The microprocessor initiates a memory read bus cycle to fetch the first instruction from memory.
2. The cache controller determines if a copy of the requested information is in cache memory. Because the cache is empty a cache miss occurs and the information must be fetched from main memory.
3. Because there is a cache miss, the cache controller initiates a memory read bus cycle to fetch the information from the DRAM making up main memory. As discussed above, this fetch will take one or more wait states.
4. The information from DRAM is sent to the microprocessor and, at the same time or shortly thereafter, a copy is placed into cache memory and the cache controller updates a directory, called a tag block or tag RAM, to indicate that the new information is in cache memory. It is important to realize that there is no advantage obtained by having cache memory in this case because the information has to be fetched from slow DRAM in main memory whenever the cache is empty or has been flushed.

5. The microprocessor initiates a series of memory read bus cycles to fetch the remaining instructions in the program loop (to take advantage of the principle of spatial locality as discussed above) as soon as the first instruction in the program loop is completed. Depending upon the size of the cache, all of the instructions in the program loop may be read into the cache where they are accessible on an immediate (zero wait state) basis by the microprocessor. Again, it is important to realize that no advantage is gained during the first execution of a program or process loop because every instruction had to be read from the slow access DRAM in main memory.

6. Normally the last instruction in the program loop is an instruction to jump to the beginning of the loop and start over again.

7. When the program begins to run again, the cache controller determines that the requested information is in cache memory and the cache controller immediately reads the information from fast SRAM and sends it to the microprocessor with 0 wait states incurred. Because the microprocessor is able to obtain the instructions with zero wait states the second time the loop is executed, the cache provides a definite performance advantage.

To meet performance goals, the Intel 486 microprocessor, for example, contains an eight Kilobyte on-chip cache. The 486 cache is software transparent to maintain compatibility with previous generations of x86 architecture. The 486 cache is a unified code and data cache which means that the cache is used for both instructions and data accesses and acts on physical addresses. The cache is logically organized as a 4-way set associative cache and the eight Kilobytes of cache memory are logically organized in 128 sets (0–127), each set containing 4 lines. The cache memory is physically split into four 2-Kilobyte blocks each containing 128 lines. Associated with each 2-Kilobyte block are 128 21-bit tags (in the tag, block) and a valid bit (in the valid bit block) for each line in the cache memory. When there is a read miss and a line is fetched from main memory and needs to be placed in the cache, the 486 microprocessor first checks the valid bits to determine if there is a non-valid line in the set that can be replaced. If a non-valid line is found, that line is replaced. If all four lines in the set are valid, a pseudo least-recently-used mechanism is used to determine which line is to be replaced.

All valid bits in the valid bit block are cleared when the processor is reset or the cache is flushed. This is, in fact, the method used to flush a cache, that is, clear the valid bits. The on-chip cache is flushed in the x86 architecture when a new process is initiated. Therefore, when a new process begins, the seven events discussed above occur for the new process. This means that when a new process is initiated, there are wait states because the cache is empty. A major disadvantage of flushing the cache each time a new process is initiated is that if the microprocessor switches from a first process to a second process and then back to the first process, the instructions for the first process that were flushed have to be fetched again from the slow DRAM in the main memory. If the microprocessor is in a situation in which the first and second processes switch back and forth, there are major performance consequences because of the alternate flushing and refetching of the same instructions. Another major disadvantage of flushing the cache is that if the second process is relatively short and does not cause all of the cache memory locations to be filled with new instructions or data and the microprocessor switches back to the first process, the instructions and data from the first process have to be fetched from main memory.

The Intel 486 microprocessor also contains an integrated paging unit with a translation lookaside buffer. The translation lookaside buffer is a four-way set associative 32-entry page table cache. The 32-entry translation lookaside buffer coupled with a 4 Kilobyte page size, results in coverage of 128 Kilobytes of memory addresses. The translation lookaside buffer operation is automatic whenever paging is enabled and the translation lookaside buffer contains the most recently used page table entries. The paging hardware operates as follows. The paging unit hardware receives a 32-bit linear address from the microprocessor. The upper 20 linear address bits are compared with entries in the translation lookaside buffer to determine if there is a match. If there is a match, i.e., a page hit, the 32-bit physical address is placed on the address bus. If there is a miss, i.e., if the linear address is not in the translation lookaside buffer, the paging unit will have to calculate a page address and access the information in external memory. The required page table entry will be read into the translation lookaside buffer and then the cache will initiate a bus cycle to fetch the actual data. The process of reading a new page table entry into the translation lookaside buffer is called a translation lookaside buffer refresh and is a two-step process. The paging unit must first read the page directory entry which points to the appropriate page table. The page table entry to be stored in the translation lookaside buffer is then read from the page table.

The translation lookaside buffer automatically keeps the most commonly used Page Table Entries in the processor. For many common multi-tasking systems, the translation lookaside buffer will have a hit rate of about 98%.

The sequence of data cycles to perform a translation lookaside buffer refresh are as follows:

1. Read the correct Page Directory Entry as pointed to by the page base register and the upper 10 bits of the linear address.
2. Read the correct entry in the Page Table and place the entry in the translation lookaside buffer.

Whenever the microprocessor switches to a new process, the translation lookaside buffer is flushed. As in the case of the cache, if the instructions and the page information are flushed for a first process and a second process is executed and the first process is started again, the cache and the translation buffer have to be refilled with the information that was just flushed.

What is needed to further improve the performance of the 486 and other similar x86 processors is a system to avoid the necessity to flush the cache and the translation lookaside buffer each time there is a context (process) switch.

SUMMARY OF THE INVENTION

An x86 microprocessor system with a process identification system. The process identification system comprises a process identification register to store the value assigned to a process by the microprocessor.

The process identification system also has a process identification memory location associated with each tag storage location in the cache. The cache determines whether the tags match, whether the process identification number is correct, and whether the valid bit is set. When all three are true, there is a cache hit.

The process identification system also has a process identification memory location associated with each tag storage location in the translation lookaside buffer. The translation lookaside buffer determines whether the tags match, whether the process identification number is correct, and whether the valid bit is set. When all three are true, there is a page hit.

The present invention is better understood upon consideration of the detailed description below, in conjunction with the accompanying drawings. As will become readily apparent from the following description to those skilled in this art, there is shown and described a preferred embodiment of this invention simply by way of illustration of the modes best suited to carry out the invention. As will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate the present invention and, together with the description, serve to explain the principles of the invention. In the drawings.

DETAILED DESCRIPTION

Referring now to the Figures, the present invention will now be explained. The microprocessor architecture shown in the Figures and discussed is a 486 microprocessor system architecture. It is to be understood that the invention comprehends other x86 architectures, and one of ordinary skill in the art will comprehend the modifications needed to apply the concepts taught herein to the other x86 architectures.

Figure 1:
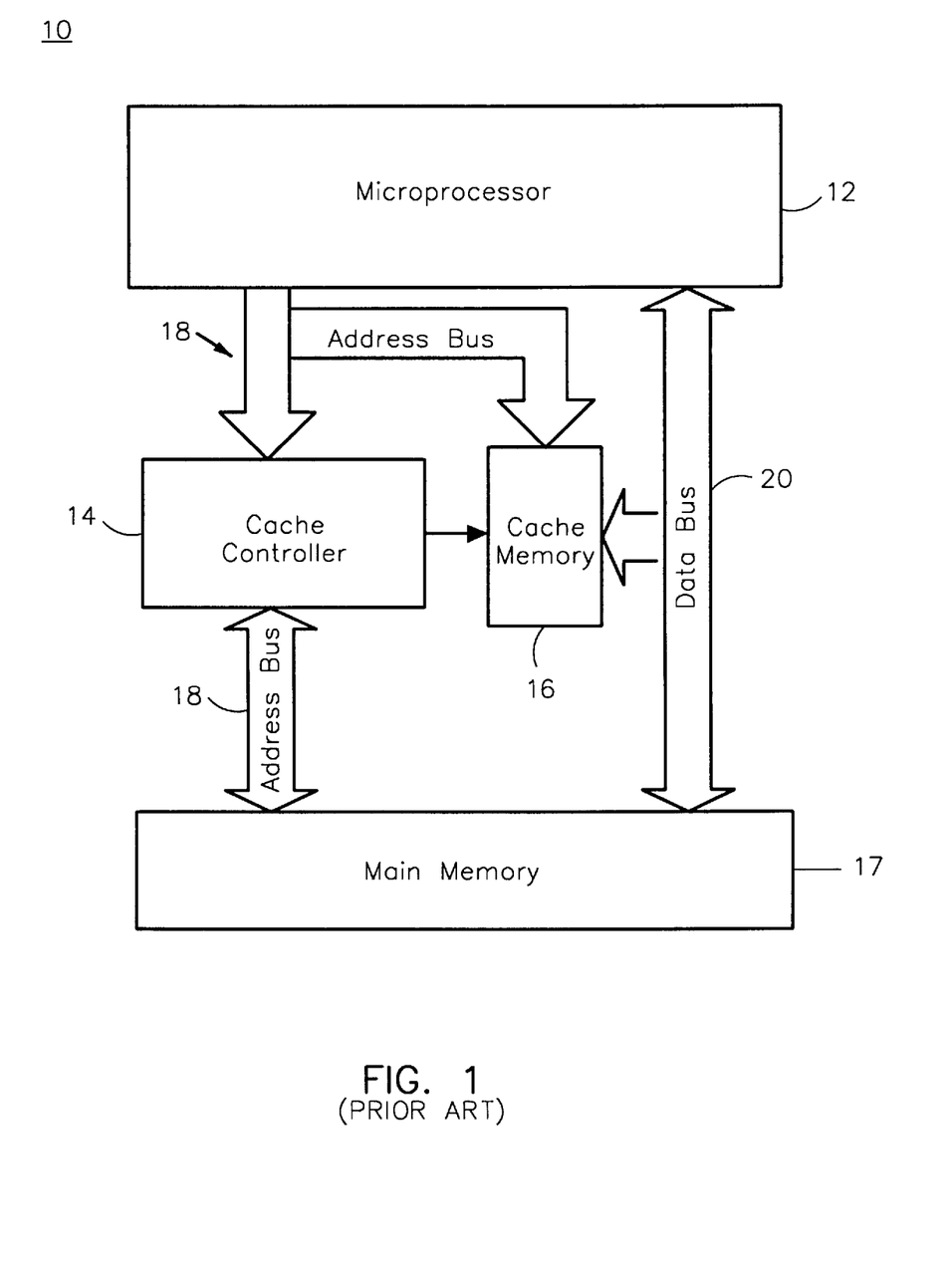
FIG. 1 shows a microprocessor system with a microprocessor, cache controller, cache memory and a main memory.

Referring now to FIG. 1, there is shown a portion of a microprocessor system 10 having a microprocessor 12, a cache controller 14, cache memory 16, and main memory 17. A first portion of address bus 18 connects microprocessor 12 to cache controller 14 and cache memory 16. A second portion of address bus 18 connects cache controller 14 to main memory 17. A data bus 20 connects microprocessor 12 to cache memory 16 and main memory 17.

Figure 2:
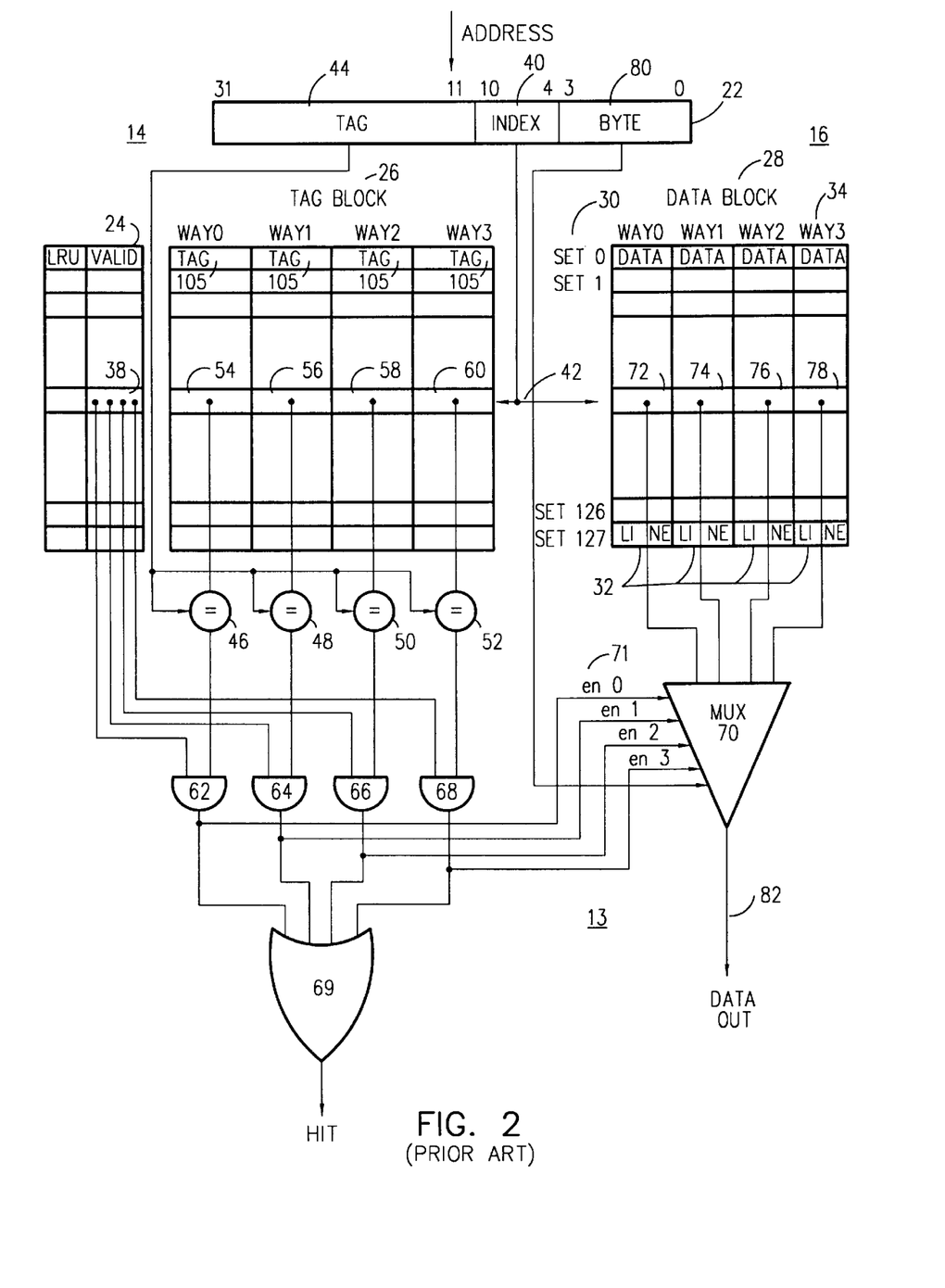
FIG. 2 is a prior art cache system as used in an x86 microprocessor system.

FIG. 2 illustrates a cache 13 with a cache controller section shown at 14 and a cache memory section shown at 16. The cache controller section 14 includes 32-bit register 22, valid bit block 24, and tag block 26. Cache memory 16 includes data block 28. The cache in a 486 microprocessor system is an eight Kilobyte cache and is organized as a four-way set associative cache. The eight Kilobytes of cache memory are logically organized as 128 sets (0–127) indicated at 30, and each set contains four lines, indicated at 32. Each line is 16 bytes long. Cache memory 16 is physically organized as four-2 Kilobyte blocks, each block having 128 lines. Associated with each two, Kilobyte block are 128 21 bit tags, indicated at 105, in tag block 26, and a valid bit, indicated at 38, for each line in cache memory 16. The remaining elements in cache controller 14 and cache memory 16 will be explained in conjunction with an explanation of the operation of the cache.

Referring now to FIGS. 1 and 2, the operation of the cache is explained as follows. Register 22 receives a series of addresses from microprocessor 12. For each address received, an index 40, comprising bit locations 4 through 10 in register 22, indicates in which of the 128 sets in cache memory 16 the instruction would be cached if it is in the cache. Index 40 points to a location in both tag block 26 and cache memory 16 as indicated at 42. A tag 44, comprising bit locations 11 through 31, is communicated to equal logic elements 46, 48, 50, and 52. The contents of tag locations, 54, 56, 58, and 60 are communicated to equal logic elements 46, 48, 50, and 52, respectively. The outputs of equal logic elements 46, 48, 50, and 52 are communicated to AND logic elements 62, 64, 66, and 68, respectively. A valid bit, indicated at 38, associated with each tag, is communicated to AND logic elements 62, 64, 66, and 68, respectively. The outputs of AND logic elements 62, 64, 66, and 68 are input to OR logic element 69. If an output of any of AND logic elements 62, 64, 66, and 68 is true, indicating that the tag 44 is present in tag block 26 and that the tag is valid, there is a cache hit, which is indicated by an output from OR logic element 69, and the true output from the pertinent AND logic element enables multiplexor 70, the operation of which will now be explained. Index 40, as discussed above, indicates in which set the data would be stored if present in cache memory 16. The content of each cache memory location 72, 74, 76, and 78 is communicated to multiplexor 70. Multiplexor 70 passes through data indicated by which enable line, indicated at 71, has been enabled. Byte indicator 80, comprising bit locations 0 through 3 in register 22, is communicated to multiplexor 70 to select which byte of data in the cache memory location selected is to be communicated to the microprocessor 12 via data out line 82.

If none of the outputs of AND logic elements 62, 64, 66, or 68 are true, a cache miss occurs and the cache controller activates a bus cycle to fetch the requested data from main memory 17. For each cache miss that occurs, the cache controller fetches instructions for the microprocessor and stores a copy in the cache. As discussed above, because of the locality of reference principle, the same instructions and data have a high probability of being used over and over again as long as the same process is being executed. However, in the x86 architectures, including the 486, when a process switch takes place, the cache is flushed. The cache is flushed by clearing all the valid bits in valid bit block 24. As can be appreciated, whenever an address is received by register 22 and all the valid bits are cleared, the cache will indicate a cache miss.

Figure 3:
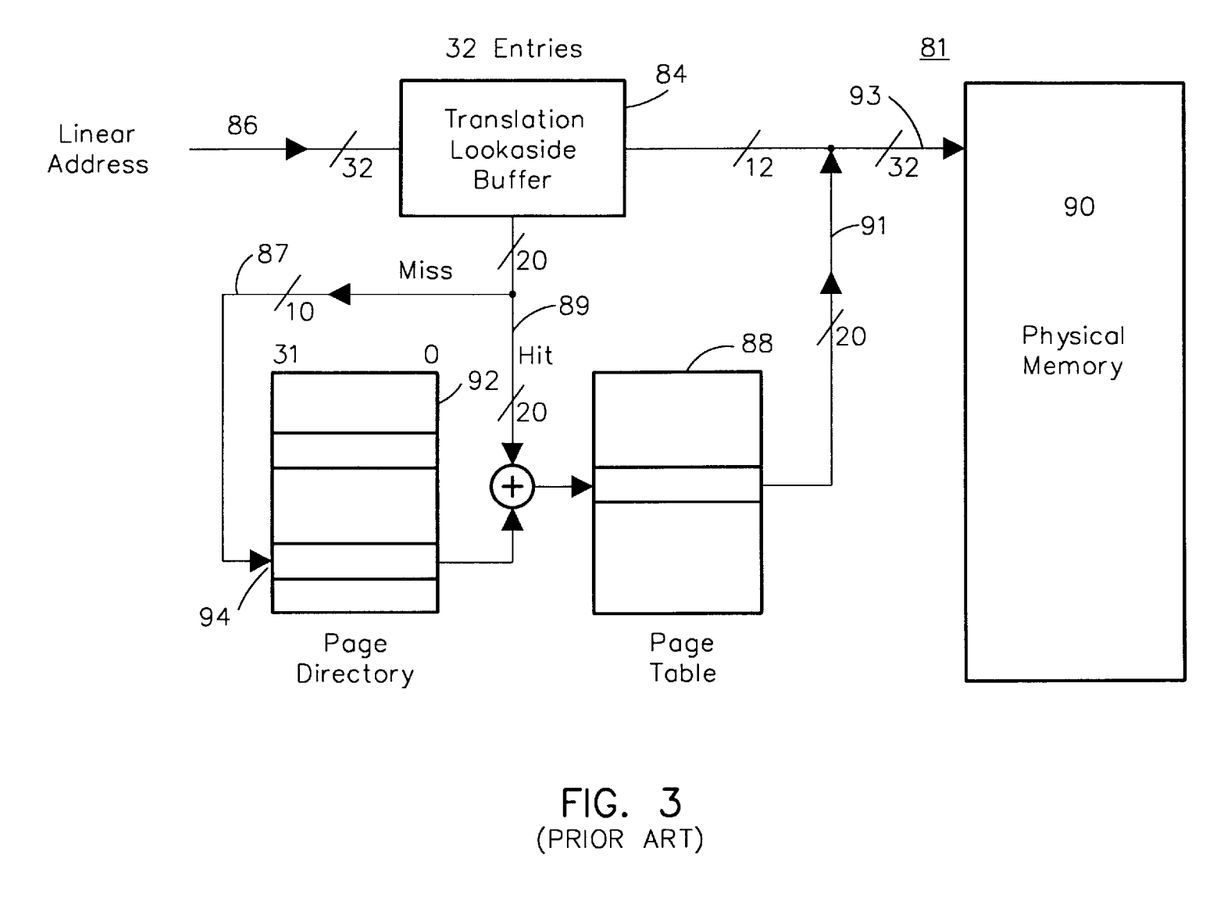
FIG. 3 shows the relationship of a translation lookaside buffer, a page directory, a page table and physical memory.

Referring now to FIG. 3, the translation lookaside buffer 84 will now be explained. The translation lookaside buffer receives a series of 32 bit linear addresses, indicated at 86, from microprocessor 12 (FIG. 1). If translation lookaside buffer 84 determines there is a "hit," page table 88 communicates the 20 upper bit page frame address which is concatenated with the lower 12 bits of the linear address to form a physical address, which is communicated to physical memory 90 via bus 93. If translation lookaside buffer 84 determines there is a miss, page directory 92 calculates a page table entry location in order for a physical address to be determined. The 486 uses two levels to translate a linear address into a physical address. The page directory 92 is 4 Kilobytes long and allows up to 1024 Page Directory Entries. Each Page Directory Entry contains the address of the next level of tables, the Page Tables, and information about the Page Table. The upper 10 bits of the linear address are communicated via bus 87 and are used as an index to select the correct Page Directory Entry indicated at 94. Page Table 88 is 4 Kilobytes long and holds up to 1024 Page Table Entries, which contain the starting address of the page frame and statistical information about the page. Linear address bits 12 to 21 are communicated via bus 89 and are used as an index to select one of the 1024 Page Table Entries in Page Table 88. The 20 upper bit page frame address from page table 88 on bus 91 is concatenated with the lower 12 bits of the linear address to form a physical address, which is communicated to Physical Memory 90 via bus 93.

Figure 4:
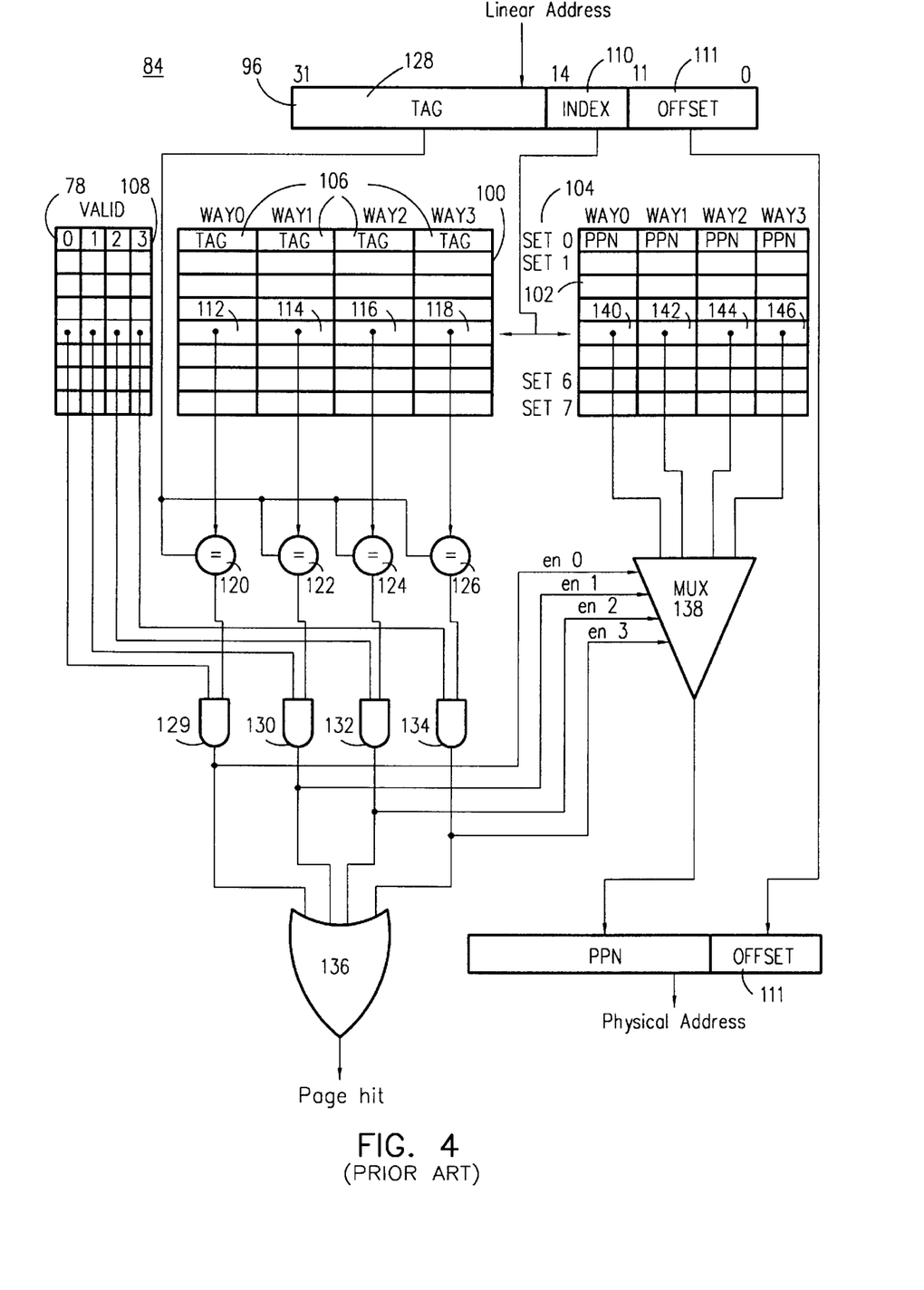
FIG. 4 is a prior art translation lookaside buffer as used in an x86 microprocessor system.

Referring now to FIG. 4, the operation of translation lookaside buffer 84 will now be explained. Translation lookaside buffer 84 includes a 32-bit register 96, a valid bit block 98, a tag block 100, and a data block 102. Data block 102 is logically organized as a four-way set associative cache memory. Data block 102 is physically organized in four blocks, each having 8 sets (0–7) indicated at 104. Associated with each memory location in data block 102 is a tag memory location, indicated at 106 in tag block 100. In addition, a valid bit location, indicated at 108 in valid bit block 98, is associated with each memory location in data block 102.

Register 96 receives a series of linear addresses from microprocessor 12 (FIG. 1). When a linear address is received, an index 110, comprised of bits 12 to 14 in register 96, indicates in which of the sets 104 the information would be located if the information is in the translation lookaside buffer. The contents of tag locations 112, 114, 116, and 118 are communicated to logic equal elements 120, 122, 124, and 126 respectively, where they are compared to tag 128 comprised of bits 15 to 31 in register 96. The OFFSET 111 is a 12 bit constant value because the 486 microprocessor memory system is a 4K aligned page system which allows the lower 12 bits in the linear address to be the same as the lower 12 bits in the physical address. The outputs of logic equal elements 120, 122, 124, and 126 are communicated to AND logic elements 129, 130, 132, and 134. A valid bit in valid bit block 98 associated with each memory location in data block 102 is communicated to AND logic elements 129, 130, 132, and 134, respectively. The outputs of AND logic elements 129, 130, 132, and 134 are input to OR logic element 136. If any one of the outputs of AND logic elements 129, 130, 132, and 134 is true, there is a page hit and a respective true output enables multiplexor 138 to output a value as follows. The contents of memory locations 140, 142, 144, and 146, all of which are in data block 102, in a set indicated by index 110, are communicated to multiplexor 138. The multiplexor 38 outputs the selected 20 bit PPN (physical page number) that has been stored in data block 102. The selected PPN is concatenated with the OFFSET 111 and forms a physical address (to be discussed below. The true output from one of the AND logic elements (129, 130, 132, or 134) enables multiplexor 138 to output the selected value from one of the memory locations 140, 142, 144, or 146. If there is not a match, there is a page miss, the requested physical page number is calculated, and the page information is obtained from memory. As long as the process is being executed, the locality of reference principle indicates that the page information pointed to by translation lookaside buffer 84 has a high probability of being used many times before another set of page information is required, and the page hit probability can be as high as 98% for some processes. However, if the microprocessor switches to a new process, all the information in the translation lookaside buffer 84 is flushed in the same way that the information in the cache 13 is flushed by clearing all the valid bits in valid bit block 98. When a new process is to be executed, the translation lookaside buffer 84 has to be refreshed with new information with the performance degradation associated with refreshing a translation lookaside buffer. As can be appreciated, if the first process is replaced by a second process and the first process information is flushed, if the microprocessor switches back to the first process, the translation lookaside buffer has to be refreshed with the information from the first process as the first process is executed.

Figure 5:
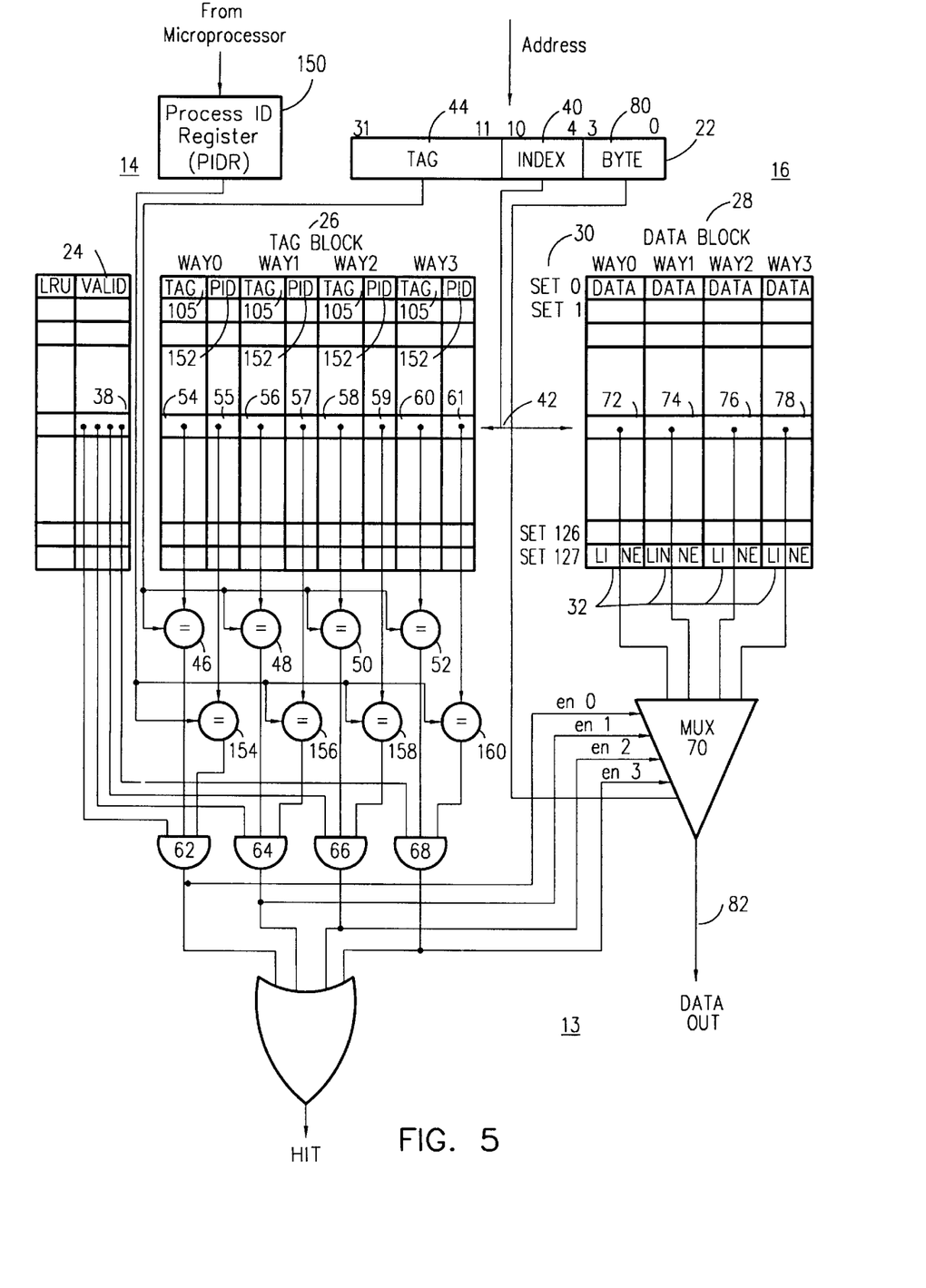
FIG. 5 is a cache of the present invention.

Referring now to FIGS. 2 and 5, the present invention relating to a cache having a process identification structure is now explained. Like elements in FIG. 5 have the same numerical designators as those in FIG. 2. Cache 13, with a process identification system of the present invention, includes a process identification register (PIDR) 150. Associated with each tag 105 in tag block 26 are process identification (PID) memory locations, indicated at 152. In addition to the structure described in FIG. 2, cache 13 further includes equal logic elements 154, 156, 158, and 160. The operation of cache 13, FIG. 5, with the process identification system of the present invention, is as follows. When microprocessor 12 (FIG. 1) initiates a first process, microprocessor 12 assigns a unique process identification (PID) number to the first process and communicates that number to PIDR register 150 via a new instruction, LDPIDR (load PIDR). As addresses are received in register 22 and as instructions are fetched and put into cache memory locations, for example cache memory locations 72, 74, 76, and 78, the process identification number from process identification register 150 is communicated to PID memory locations 55, 57, 59, and 61. When a new address is received in register 22, the PID number in register 150 is communicated to equal logic elements 154, 156, 158, and 160 where it is compared to the values communicated from PID memory locations such as PID memory locations 55, 57, 59, and 61, respectively. The outputs from equal logic elements 154, 156, 158, and 160 are input into AND logic elements 62, 64, 66, and 68, respectively. As described above in relation to FIG. 2, the values in tag locations 54, 56, 58, and 60, are compared to tag 44 located in register 22 and input into AND logic elements 62, 64, 66, and 68 along with inputs from valid bit block 24. A true output from one of AND logic elements 62, 64, 66, and 68 indicates a cache hit. Multiplexor 70 outputs data as described above in the discussion relating to FIG. 2.

When a context switch occurs, a process is ended and a new process initiated. Microprocessor 12 (FIG. 1) stores the unique process identification number assigned to process 1 via a new instruction STPIDR (store PIDR), assigns a unique process identification number to process 2, and communicates the process identification number for process 2 to the process identification number register 150 via the new instruction (LDPIDR). As new instructions are fetched for process 2, they are cached as described above, except with a process identification number assigned for process 2. The advantage with this procedure is that if the microprocessor switches back to process 1, those instructions and data for process 1 that have not been replaced by instructions and data for process 2 remain in the cache and can be accessed because the microprocessor will reload the unique process identification number for process 1 and that number will still be in the PID locations associated with process 1 instructions and data that have not been replaced by a subsequent process.

Figure 6:
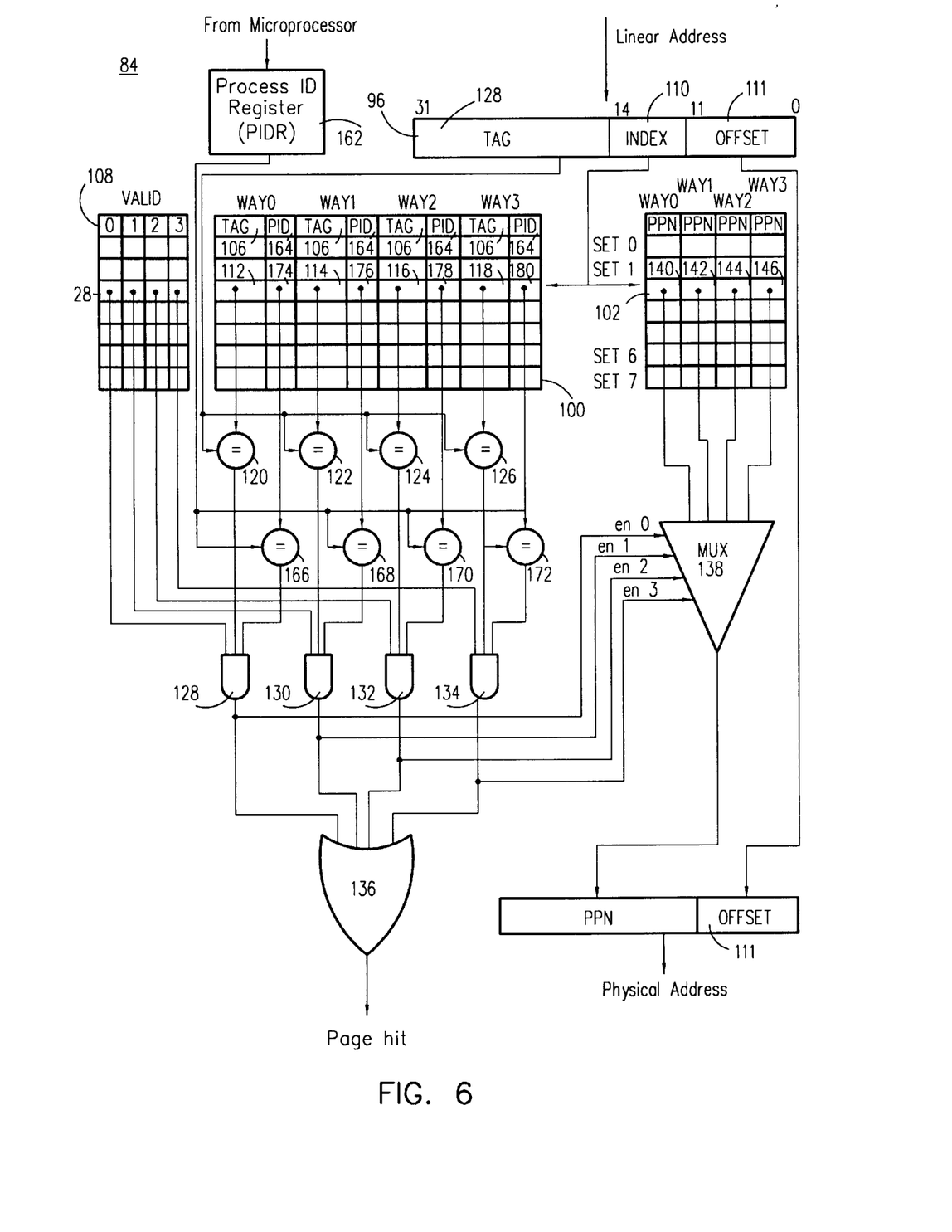
FIG. 6 is a translation lookaside buffer of the present invention.

Referring now to FIGS. 4 and 6, the present invention relating to a translation lookaside buffer having a process identification structure is now explained. Like elements in FIG. 6 have the same numerical designators as those in FIG. 4. Translation lookaside buffer 84, with a process identification system of the present invention, includes a process identification register (PIDR) 162. It is noted that only one process identification register may be needed and that process identification register 150, FIG. 5, and process identification register 162, FIG. 6, may be one and the same. However, for explanation purposes, process identification register 162, FIG. 6, will be discussed as being a second register. Associated with each tag 106 in tag block 100 are process identification (PID) memory locations, indicated at 164. In addition to the structure described in FIG. 4, translation lookaside buffer 84 further includes equal logic elements 166, 168, 170, and 172. The operation of translation lookaside buffer 84 in FIG. 4, with the addition of the process identification system of the present invention, is as follows. When microprocessor 12 (FIG. 1) initiates a first process, microprocessor 12 assigns a unique process identification (PID) number to the first process and communicates that number to PIDR register 162 via a new instruction, LDPIDR, (load PIDR with the value assigned to process 1). As linear addresses are received in register 96 and as paging information is calculated and stored in memory locations, for example memory locations 140, 142, 144, and 146, the process identification number from process identification register 162 is communicated to PID memory locations 174, 176, 178, and 180. When a new linear address is received in register 96, the PID number in PIDR register 162 is communicated to equal logic elements 166, 168, 170, and 172 where it is compared to the values communicated from PID memory locations such as PID memory locations 174, 176, 178, and 180, respectively. The outputs from equal logic elements 166, 168, 170, and 172 are input into AND logic elements 128, 130, 132, and 134, respectively. As described above in relation to FIG. 4, the values in tag locations 112, 114, 116, and 118 are compared to tag 128 located in register 96 and input into AND logic elements 128, 130, 132, and 134 along with inputs from valid bit block 28. A true output from one of AND logic elements 128, 130, 132, or 134 indicates a page hit. Multiplexor 138 outputs data as described above in the discussion relating to FIG. 4.

As can be appreciated by one of ordinary skill in this art, changes to the various operating systems designed to run on the x86 systems will need to be made to accommodate the process identification system of the present invention. A person of ordinary skill in designing operating systems for x86 microprocessor systems will be able to make the necessary modifications without undue experimentation.

As is well known, x86 microprocessor systems are designed to be backward compatible, that is, software written for earlier versions of an x86 microprocessor system must be able to run on later versions of an x86 microprocessor. The would require the process identification system to be invisible to programs that do not recognize the process identification system. This could be done, for example, by adding logic that would initialize the process identification register (PIDR 150, FIG. 5 and PIDR 162, FIG. 6) to zero at reset. If the PIDR 150 or PIDR 162 are never changed, all the PID memory locations in the cache and all the PID memory locations in the translation lookaside buffer will always be zero and thus will always match the PIDR.

There are three new instructions that are needed: a LDPIDR instruction to load the value assigned to a process into the process identification register; a STPIDR instruction to store the value in the process identification register which was assigned to a process that is being terminated; and a FLUSHPID instruction to flush the contents of the process identification register. Also needed may be a FLUSHPID interrupt to flush the process identification register. The operation of an interrupt is well known in the art and will not be discussed. A FLUSHPID interrupt would cause an interrupt in the system and flush the contents of the process identification register.

What we claim is:

1. An x86 microprocessor system having a microprocessor, a main memory, and a process identification system, wherein the microprocessor system executes instructions contained in one or more processes, wherein the microprocessor system comprises:

a microprocessor;

a cache memory system comprising:

a first address register for receiving a series of addresses from the microprocessor;

a first process identification register for receiving and storing a process identification number assigned by the microprocessor for a process being currently executed by the microprocessor;

a first tag block having memory locations to store a tag derived from each of the series of addresses received from the microprocessor and having memory locations to store the process identification number with each stored tag, wherein all of the memory locations in the first tag block are available to store the tag and process identification number for the process being currently executed by the microprocessor;

a first data block having memory locations to store data received from memory locations in the main memory identified by each of the series of addresses received from the microprocessor;

a first valid bit block to store a valid bit to indicate whether each tag stored in the tag block is valid; and a first logic element to determine if data identified by each of the series of addresses received from the microprocessor is in the cache memory.

2. The x86 microprocessor system of claim 1 wherein the first logic element comprises:

first logic equal elements to determine if a tag derived from an address received from the microprocessor is equal to a tag in the first tag block;

second logic equal elements to determine if the process identification number stored with each tag is equal to the process identification number stored in the first process identification register; and first AND logic elements each having an output and each having inputs from one of the first logic equal elements, one of the second logic equal elements and the valid bit block;

wherein, if the output from one of the first AND logic elements is true the data identified by the address received from the microprocessor is stored in the first data block.

3. The x86 microprocessor system of claim 2 further comprising a second logic element to output data stored in the first data block that is identified by the address received from the microprocessor.

4. The x86 microprocessor system of claim 3 further comprising a translation lookaside buffer.

5. The x86 microprocessor system of claim 4 wherein the translation lookaside buffer comprises:

a second address register for receiving a series of linear addresses;

a second process identification register for receiving and storing the process identification number;

a second tag block having memory locations to store a tag derived from each of the series of linear addresses and having memory locations to store the process identification number with each stored tag in the second tag block;

a second data block having memory locations to store a page table entry identified by each of the series of linear addresses;

a second valid bit block to store a valid bit to indicate whether each tag stored in the second tag block is valid; and a third logic element to determine if a page table entry identified by each of the series of linear addresses is in the second data block.

6. The x86 microprocessor system of claim 5 wherein the third logic element comprises:

third logic equal elements to determine if a tag derived from a received linear address is equal to a tag in the second tag block;

fourth logic equal elements to determine if the process identification number stored with each tag is equal to the process identification number stored in the second process identification register; and second AND logic elements each having an output and each having inputs from one of the third logic equal elements, one of the fourth logic equal elements and the valid bit block;

wherein, if the output from one of the second AND logic element is true the page table entry identified by the linear address is stored in the second data block.

7. The x86 microprocessor system of claim 6 further comprising a third logic element to output a page table entry that is identified by the linear address.

* * * * *